(12) United States Patent
Mukai et al.

(10) Patent No.: US 8,509,619 B2
(45) Date of Patent: Aug. 13, 2013

(54) COMMUNICATION CONTROL METHOD, STATION SIDE DEVICE, SUBSCRIBER SIDE DEVICE, AND COMMUNICATION SYSTEM

(75) Inventors: Hiroaki Mukai, Tokyo (JP); Takashi Kikuzawa, Tokyo (JP); Tetsuya Yokotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 433 days.

(21) Appl. No.: 12/812,167

(22) PCT Filed: Jan. 8, 2008

(86) PCT No.: PCT/JP2008/050086
§ 371 (c)(1),
(2), (4) Date: Jul. 8, 2010

(87) PCT Pub. No.: WO2009/087761
PCT Pub. Date: Jul. 16, 2009

(65) Prior Publication Data
US 2010/0290784 A1 Nov. 18, 2010

(51) Int. Cl.
*H04J 14/00* (2006.01)
(52) U.S. Cl.
USPC .................. 398/66; 398/67; 398/68; 398/69; 398/70; 398/71
(58) Field of Classification Search
USPC ........................................................... 398/66
See application file for complete search history.

(56) References Cited

U.S. PATENT DOCUMENTS

| | | | | |
|---|---|---|---|---|
| 6,415,323 | B1* | 7/2002 | McCanne et al. | 709/225 |
| 7,573,891 | B1* | 8/2009 | Chow et al. | 370/401 |
| 8,045,857 | B2* | 10/2011 | Nomura et al. | 398/66 |
| 2005/0047782 | A1* | 3/2005 | Davis et al. | 398/58 |
| 2005/0201554 | A1* | 9/2005 | Kramer et al. | 380/28 |

(Continued)

FOREIGN PATENT DOCUMENTS

| CN | 1852253 A | 10/2006 |
|---|---|---|
| CN | 101095122 A | 12/2007 |

(Continued)

OTHER PUBLICATIONS

IEEE Std 802.3-2002 Ethernet in the First Mile, IEEE Draft P802. 3ah/D3.3 Apr. 19, 2004.*

(Continued)

*Primary Examiner* — Kenneth N Vanderpuye
*Assistant Examiner* — Abbas H Alagheband
(74) *Attorney, Agent, or Firm* — Oblon, Spivak, McClelland, Maier & Neustadt, L.L.P.

(57) ABSTRACT

A communication control method performing Discovery processing, which is a procedure at an OLT to detect an ONU newly connected, in a PON system, the method includes: a transmission-permission-signal transmitting step of transmitting, by the OLT, a transmission permission signal for discovery, which includes an individual number of an ONU that is permitted to respond and mask information for designating a match-detection target bit for the individual number; and a registration-request-signal transmitting step of comparing, by an ONU, which is not registered in the OLT, a match-detection target bit for the individual number designated in the mask information with an individual number of the ONU based on a received transmission permission signal, and when the target bit and the individual number match each other, transmitting a registration request signal to the OLT.

4 Claims, 9 Drawing Sheets

(56) References Cited

U.S. PATENT DOCUMENTS

| | | | |
|---|---|---|---|
| 2005/0243837 A1* | 11/2005 | Boyd et al. | 370/395.52 |
| 2005/0249498 A1* | 11/2005 | Haran et al. | 398/58 |
| 2006/0149911 A1* | 7/2006 | Kimelman et al. | 711/163 |
| 2007/0133800 A1* | 6/2007 | Kim et al. | 380/256 |
| 2007/0147835 A1* | 6/2007 | Kim et al. | 398/71 |
| 2007/0172236 A1* | 7/2007 | Nomura et al. | 398/45 |
| 2007/0201867 A1* | 8/2007 | DeLew et al. | 398/38 |
| 2008/0124075 A1* | 5/2008 | Xu et al. | 398/25 |
| 2009/0052894 A1* | 2/2009 | Murata | 398/43 |
| 2009/0263132 A1* | 10/2009 | Rafel et al. | 398/66 |

FOREIGN PATENT DOCUMENTS

| | | |
|---|---|---|
| JP | 2001 326666 | 11/2001 |
| JP | 2003-244179 | 8/2003 |
| JP | 2004 201099 | 7/2004 |
| JP | 2005 347980 | 12/2005 |
| JP | 2007 67948 | 3/2007 |
| JP | 2007-324885 | 12/2007 |
| JP | 4065892 | 3/2008 |

OTHER PUBLICATIONS

"Multi-point MAC Control", IEEE Draft P802.3ah™/D3.3 CLAUSE 64, pp. 469-526, (Apr. 19, 2004).
Japanese Office Action issued Jul. 12, 2011, in Patent Application No. 2009-548831 (with Partial English-language translation).
Notice of Allowance issued Sep. 28, 2011 in Korean Application No. 10-2010-7016791.
Combined Chinese Office Action and Search Report Issued Dec. 20, 2012 in Patent Application No. 200880124281.4 (with English translation and English translation of Categories of Cited Documents).

* cited by examiner

FIG.6
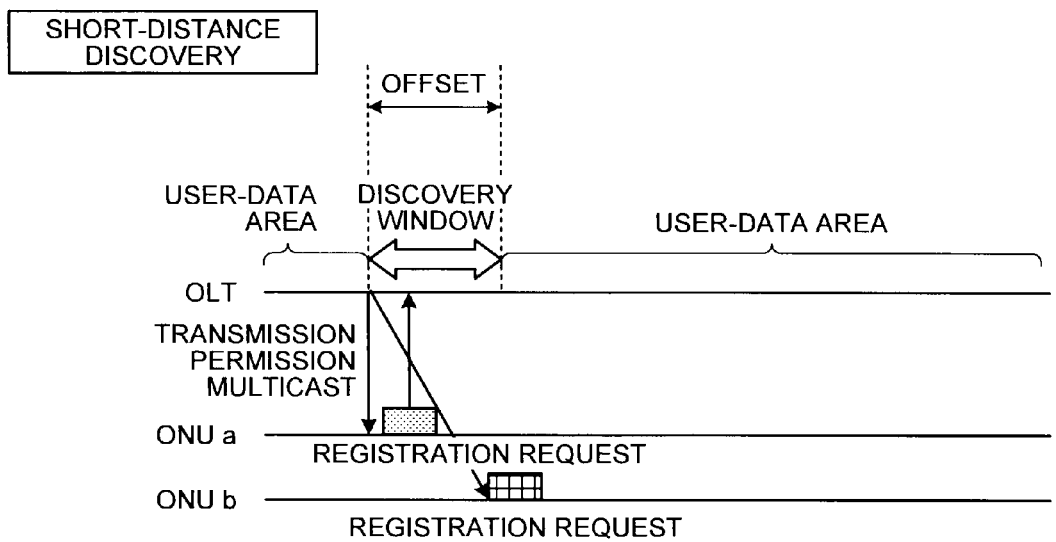
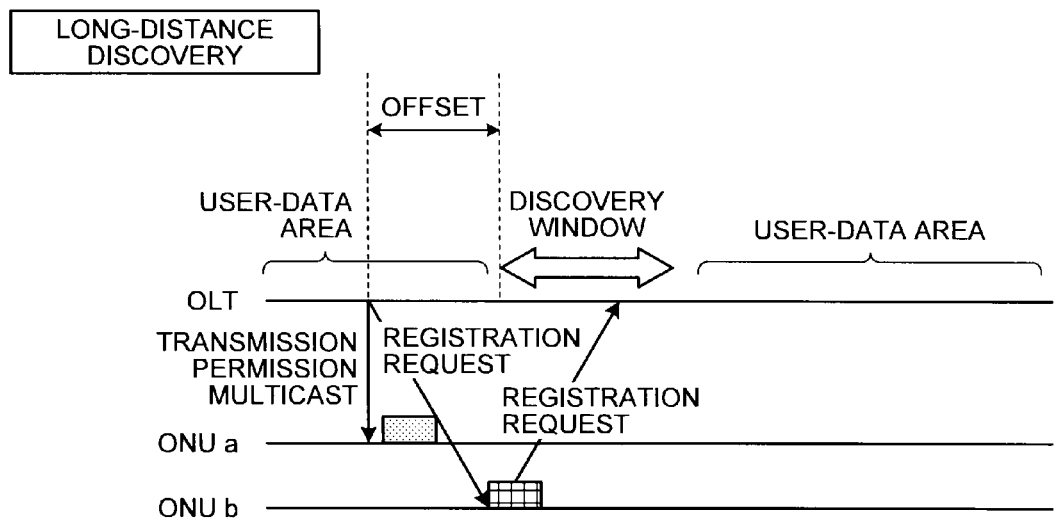

FIG.7

| DISTANCE FROM OLT | ONU MAC ADDRESS | | | | | |
| --- | --- | --- | --- | --- | --- | --- |
| | Octet 1 | Octet 2 | Octet 3 | Octet 4 | Octet 5 | Octet 6 |
| 0 TO 10 km | xxxx xxxx | xxxx xxxx | xxxx xxxx | 0000 xxxx | xxxx xxxx | xxxx xxxx |
| 10 TO 20 km | xxxx xxxx | xxxx xxxx | xxxx xxxx | 0001 xxxx | xxxx xxxx | xxxx xxxx |
| 20 TO 30 km | xxxx xxxx | xxxx xxxx | xxxx xxxx | 0010 xxxx | xxxx xxxx | xxxx xxxx |
| 30 TO 40 km | xxxx xxxx | xxxx xxxx | xxxx xxxx | 0011 xxxx | xxxx xxxx | xxxx xxxx |

COMMUNICATION CONTROL METHOD, STATION SIDE DEVICE, SUBSCRIBER SIDE DEVICE, AND COMMUNICATION SYSTEM

TECHNICAL FIELD

The present invention relates to a communication control method for cases when Discovery processing is performed in a PON system.

BACKGROUND ART

In a PON (Passive Optical Network) system, when an ONU (Optical Network Unit) as a subscriber side device is connected, an individual number of the ONU is registered in an OLT (Optical Line Terminal), which is a station side device. Conventionally, the OLT performs Discovery processing at an arbitrary timing to collect individual numbers (correspond to MAC addresses in E-PON (Ethernet (registered trademark) PON)) of ONUs and registers the ONUs in an OLT database (see Nonpatent Literature 1).

When collecting individual numbers of ONUs, the OLT does not allocate user data in a time window in which registration request signals from ONUs are expected to be received. This time window is called a discovery window. The discovery window needs to be opened for a time required to cover round-trip times for installed ONUs. However, when the discovery window is extended to cover round-trip times, available user bandwidths are decreased.

Patent Document 1 mentioned below describes a technique of setting a fixed delay for an ONU when the ONU is newly set up and detecting the ONU within a narrow discovery window, thereby saving the bandwidth consumed for the discovery window.

Meanwhile, the PON system is a system of providing subscribers with economical optical access by sharing an optical fiber among a large number of subscribers; the more subscribers share an optical fiber, the higher its economic effects will be. Accordingly, the PON system has been undergoing improvements on a further split-ratio increase and extension.

Patent Document 1: Japanese Patent Application Laid-open No. 2001-326666

Nonpatent Literature 1: IEEE802.3ah Clause 64, Multi-point MAC Control

DISCLOSURE OF INVENTION

Problem to be Solved by the Invention

However, conventional techniques have a problem in that a significant amount of time is required to acquire individual numbers of ONUs through execution of Discovery processing when, for example, an increase in split ratio is made for the purpose of increasing subscribers to share an optical fiber. For instance, the OLT transmits a transmission permission signal for discovery to a multicast address as a destination. Thereafter, the OLT opens a discovery window for receiving registration request signals from ONUs, and does not allocate user grants to ONUs that are already in an operating state. Meanwhile, ONUs can avoid collisions of signals by transmitting registration request signals at a random timing within a time slot designated by the OLT upon receiving the transmission permission signals. Thus, collisions of signals transmitted from ONUs can be reduced to a certain extent by transmitting registration request signals at a random timing. However, when the number of ONUs increases as a result of a further split-ratio increase, the possibility of collisions rises and the number of discovery trials increases. This leads to an increase of the time required before an ONU is registered in the OLT. As a result, start of a service for the ONU can be delayed.

While the possibility of collisions can be reduced by extending a time slot with random delay, time slot extension leads to a decrease in user bandwidth and an increase in delay variations for signals transmitted from ONUs in an operating state, thereby causing degradation in the communication quality.

Further, when extension is performed to increase subscribers to share an optical fiber in conventional techniques, it is necessary to provide a discovery window that covers a round-trip time for an ONU located closest and a round-trip time for another ONU located farthest, and thus a larger discovery window is required. This leads to the problem of decreasing available user bandwidths.

The present invention has been achieved in view of the above problems, and an object of the invention is to provide a communication control method capable of avoiding a decrease in user bandwidth or an increase in delay variations associated with execution of Discovery processing, even when a further split-ratio increase or extension is performed in a PON system.

Means for Solving Problem

An aspect of the present invention includes a transmission-permission-signal transmitting step of transmitting, by the station side device, a transmission permission signal for discovery, which includes an individual number of a subscriber side device that is permitted to respond and mask information for designating a match-detection target bit for the individual number; and a registration-request-signal transmitting step of comparing, by a subscriber side device, which is not registered in the station side device, a match-detection target bit for the individual number designated in the mask information with an individual number of the subscriber side device based on a received transmission permission signal, and when the target bit and the individual number match each other, transmitting a registration request signal to the station side device.

Effect of the Invention

According to the present invention, because the number of subscriber side devices that respond simultaneously can be limited, the possibility that registration request signals collide can be reduced without extending the discovery window, even when a further split-ratio increase or extension is performed. In addition, because reduction of the possibility of signal collisions can reduce the number of times discovery is tried, the time before start of a service can be shortened as well.

BRIEF DESCRIPTION OF DRAWINGS

FIG. 6 depicts an outline of discovery in a second embodiment.

FIG. 7 depicts an example of a correspondence between an OLT-ONU distance and a MAC address of an ONU.

EXPLANATIONS OF LETTERS OR NUMERALS

Figure 1:
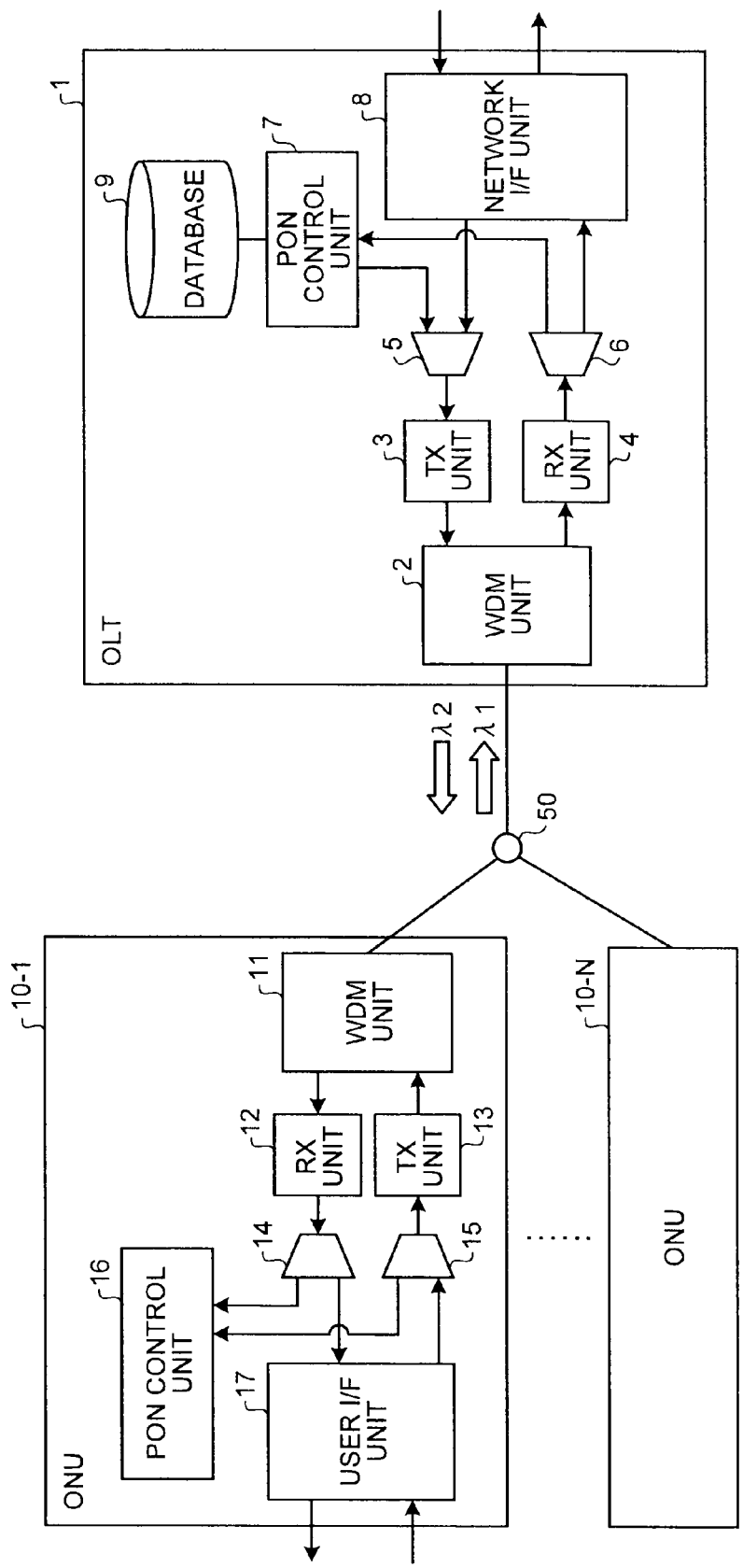
FIG. 1 depicts a configuration example of a PON system in which a communication control method according to the present invention can be performed.

1 OLT
2 WDM unit
3 TX unit
4 RX unit
5 MUX unit
6 DeMUX unit
7 PON control unit
8 Network I/F unit
9 Database
10-1 to 10-N ONU
11 WDM unit
12 RX unit
13 TX unit
14 DeMUX unit
15 MUX unit
16 PON control unit
17 User I/F unit
50 Splitter

BEST MODE(S) FOR CARRYING OUT THE INVENTION

Exemplary embodiments of a communication control method according to the present invention will be explained below in detail with reference to the accompanying drawings. The present invention is not limited to the embodiments.

First Embodiment

FIG. 1 depicts a configuration example of a PON system in which the communication control method according to the present invention can be performed. The PON system shown in FIG. 1 includes an OLT 1, ONUs 10-1 to 10-N (N=1, 2, ... ), and a splitter 50, and these devices are connected by optical cables. The PON system adopts wavelength division multiplexing (hereinafter, WDM), and transmits multiplexed optical signals having different wavelengths on an optical cable. Each of the ONUs transmits an upstream burst optical signal with a wavelength λ1 to the OLT 1. The OLT 1 transmits a downstream optical signal with a wavelength λ2 to each of the ONUs.

The OLT 1 includes a WDM unit 2, a TX unit 3, an RX unit 4, a MUX unit 5, a DeMUX unit 6, a PON control unit 7, a network I/F unit 8, and a database 9. The WDM unit 2 is an interface that supports the wavelength division multiplexing, and transmits and receives optical signals. The TX unit 3 converts an electric signal output from the MUX unit 5 to an optical signal by performing E/O (Electric/Optical) conversion. The RX unit 4 converts an optical signal output from the WDM unit 2 into an electric signal by performing O/E (Optical/Electric) conversion. The MUX unit 5 multiplexes a downstream PON control signal with user data. The DeMUX unit 6 demultiplexes an upstream PON control signal from user data. The PON control unit 7 generates a PON control signal and outputs the signal to the MUX unit 5, and also analyzes a PON control signal output from the DeMUX unit 6. The network I/F unit 8 transmits and receives user data. The database 9 has stored therein information about ONUs in an operating state which is obtained by execution of Discovery processing. Also, the database 9 has stored therein information necessary for execution of Discovery processing and the like. The "operating state" refers to a state in which an ONU is connected to the PON system and is in operation.

Each of the ONUs 10-1 to 10-N has a WDM unit 11, an RX unit 12, a TX unit 13, a DeMUX unit 14, a MUX unit 15, a PON control unit 16, and a user I/F unit 17. The WDM unit 11 is an interface that supports the wavelength division multiplexing, and transmits and receives optical signals. The RX unit 12 converts an optical signal output from the WDM unit 11 into an electric signal by performing O/E conversion. The TX unit 13 converts an electric signal output from the MUX unit 15 to an optical signal by performing E/O conversion. The DeMUX unit 14 demultiplexes a downstream PON-control signal from user data. The MUX unit 15 multiplexes an upstream PON-control signal with user data. The PON control unit 16 generates a PON control signal and outputs the signal to the MUX unit 15, and also analyzes a PON control signal output from the DeMUX unit 14. The user I/F unit 17 transmits and receives user data.

Figure 2:
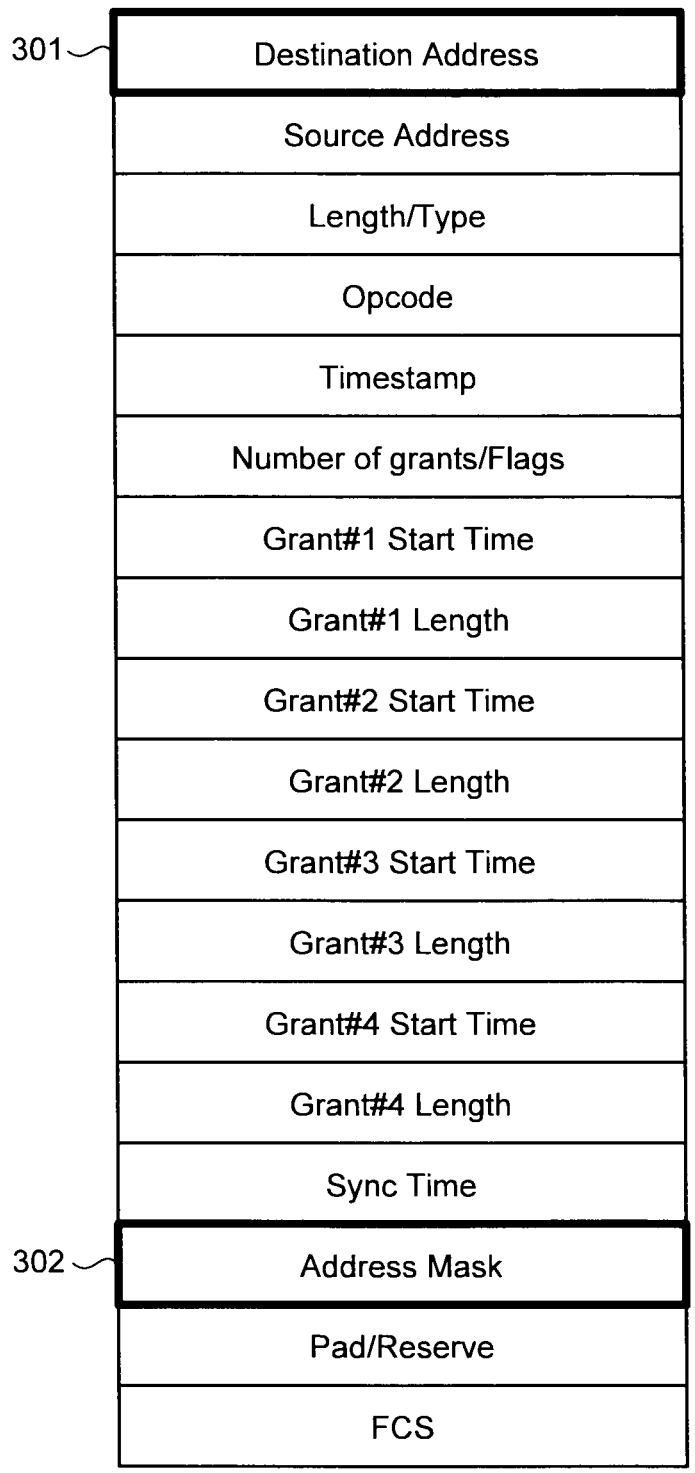
FIG. 2 depicts an example of a format of a transmission permission signal for discovery.

FIG. 2 is an example of a format of a transmission permission signal for discovery generated by the PON control unit 7 of the OLT 1. In this example, the transmission permission signal for discovery is defined using a GATE message, which is specified in IEEE802.3ah. A destination address 301 is an individual number of an ONU, to which a MAC address of the ONU is set according to IEEE802.3ah. The present embodiment further defines an address mask 302 in the GATE message. The PON control unit 7 of the OLT 1 designates an ONU which is permitted to transmit a registration request signal based on the destination address 301 and the address mask 302.

Figure 3:
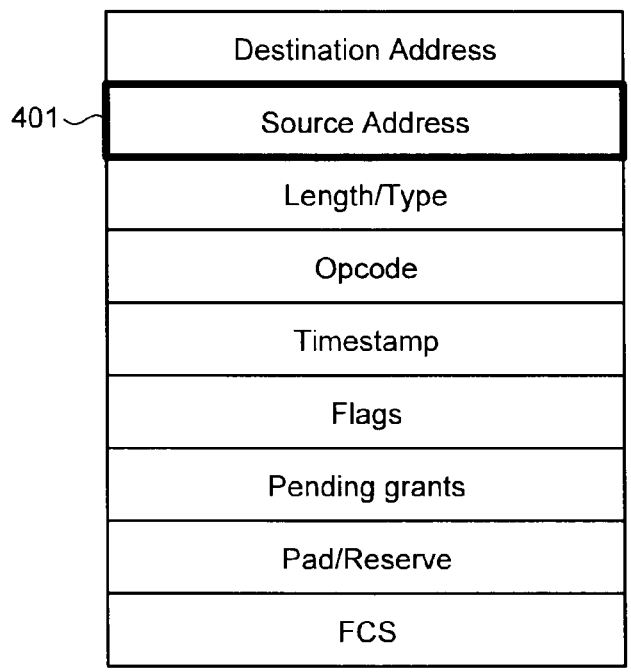
FIG. 3 depicts an example of a format of a registration request signal.

FIG. 3 is an example of a format of a registration request signal generated by the PON control unit 16 of an ONU. In this example, the registration request signal is defined using a Register Request message, which is specified in IEEE802.3ah. A source address 401 is an individual number of the ONU, to which the MAC address of the ONU is set similarly to the above. The PON control unit 16 of the ONUs 10-1 to 10-N receives the transmission permission signal for discovery shown in FIG. 2, and upon satisfying a certain condition, notifies the OLT 1 of its individual number in the registration request signal shown in FIG. 3. Upon successfully receiving the registration request signal, the OLT 1 stores the ONU's individual number and other pieces of information in the database 9.

Figure 4:
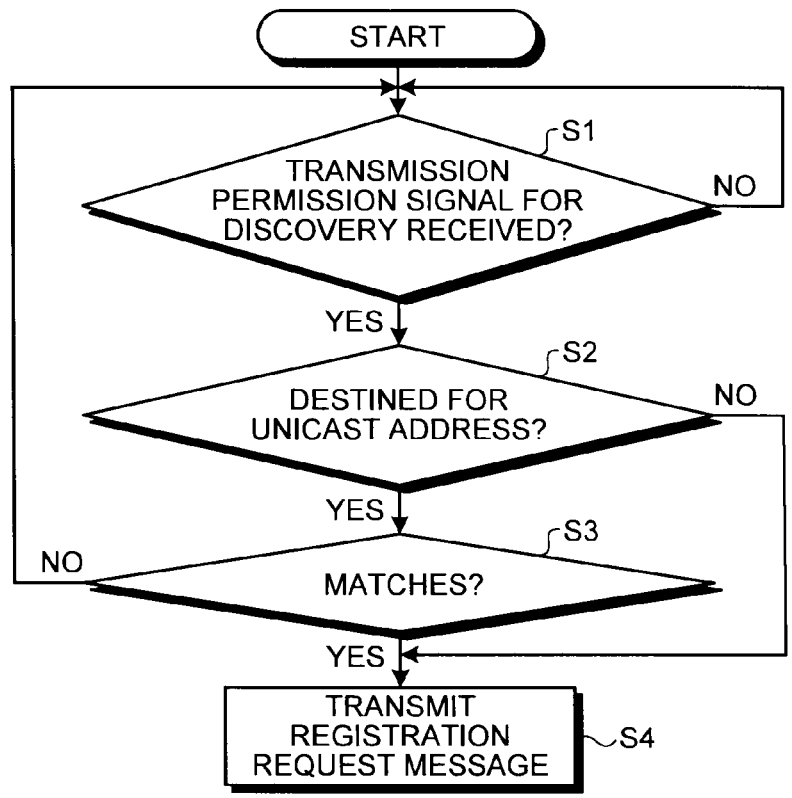
FIG. 4 is a flowchart showing a communication control method according to a first embodiment.

A communication control method according to the first embodiment is explained in detail with reference to the drawings. FIG. 4 is a flowchart of an operation of an ONU. First, the ONU checks whether a transmission permission signal for discovery has been received (Step S1). When a transmission permission signal for discovery is received (YES at Step S1), the PON control unit 16 determines whether the received signal has been transmitted in unicast transmission based on the value of the destination address 301 (Step S2). For example, when the signal has been transmitted in unicast transmission (YES at Step S2), the PON control unit 16 refers to the destination address 301 and the address mask 302, and compares the value at a bit position designated in the address mask 302 with its own MAC address (Step S3).

When the designated bit in the destination address 301 matches its own MAC address at Step S3 (YES at Step S3), the PON control unit 16 of the ONU creates a message with the source address 401 set to its own MAC address, and transmits the message to the OLT 1 as a registration request signal (Step S4). At this time, the message can also be transmitted with a random delay added as conventionally done.

When it is determined at Step S2 that the received signal has been transmitted in multicast transmission (NO at Step S2), the PON control unit 16 of the ONU transmits a registration request signal to the OLT 1 according to the conventional procedure (Step S4). Further, when the designated bit and its MAC address do not match each other at Step S3 (No at Step S3), the PON control unit 16 of the ONU repeats the process from Step S1 to S3 until they match.

Meanwhile, the PON control unit 7 of the OLT 1, upon receiving the registration request signal, determines that the ONU having the MAC address set as the source address 401 is in an operating state, and registers the ONU in the database 9.

Figure 5:
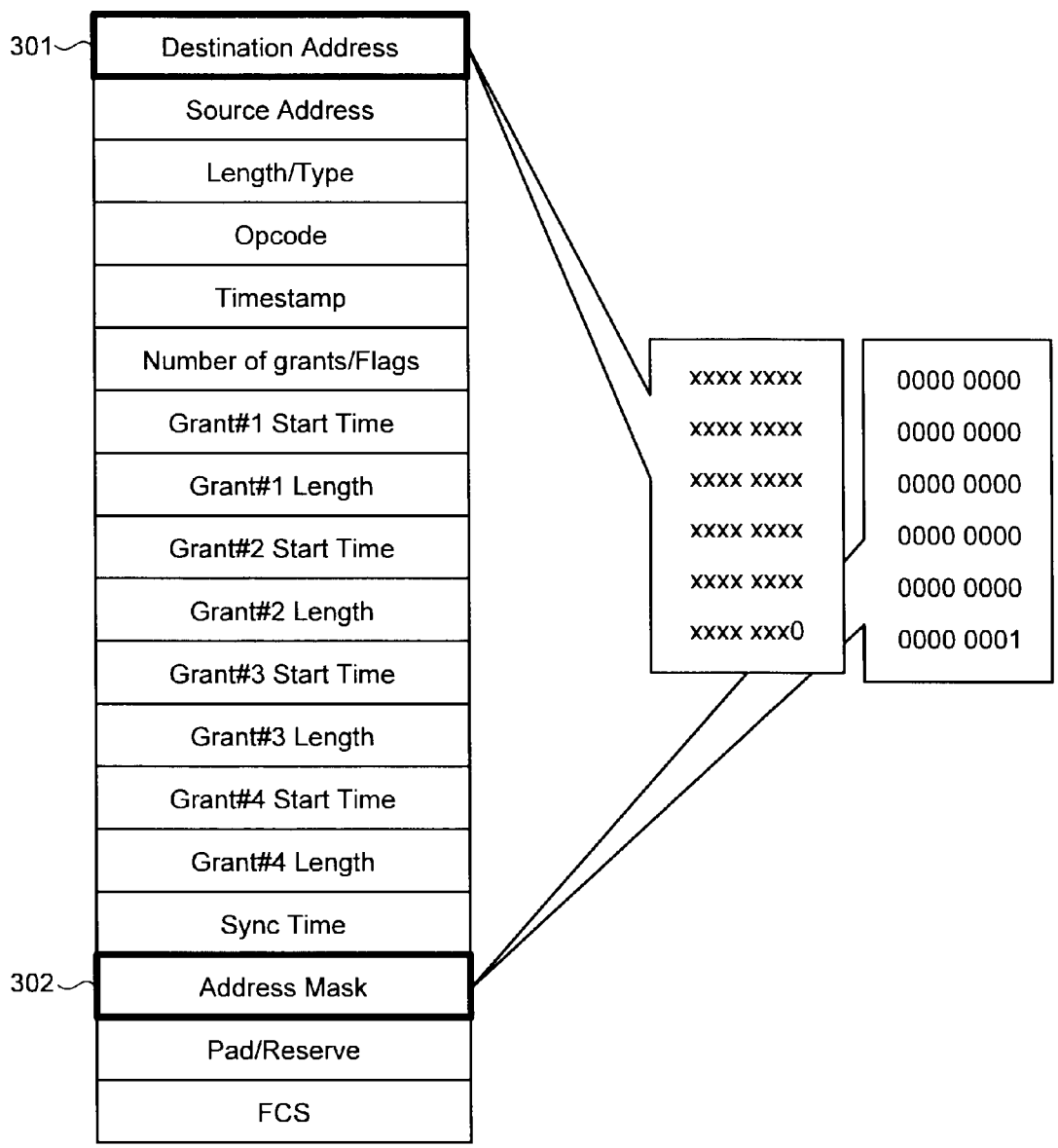
FIG. 5 depicts an example of a transmission permission signal for discovery.

FIG. 5 is an example of a transmission permission signal for discovery that permits ONUs with the least significant bits of their MAC addresses being "0" to transmit a registration request signal. For example, it is assumed that only ONUs that have "0" in the least significant bits of their MAC addresses are permitted to transmit a transmission permission signal. In this case, the OLT 1 sets only the least significant bit of the address mask 302 as "1" as shown in FIG. 5. Then, the OLT 1 transmits to the ONUs a transmission permission signal for discovery, which designates match retrieval for only the least significant bit. Only the ONU that recognizes matching of the least significant bit transmits a registration request signal to the OLT 1. The "x" in FIG. 5 is an arbitrary number of "0" or "1". In addition, while FIG. 5 explains a case where match retrieval for the least significant bit is instructed, the present invention is not limited thereto and match retrieval for more bits can be performed. In the case of matching more bits, the frequency of collisions can be further reduced.

As described above, the present embodiment masks a part of ONUs' individual number when a transmission permission signal for discovery is transmitted in the PON system. Because this can limit the number of ONUs that respond at a time, the possibility that registration request signals collide can be reduced without extending the discovery window, even when a further split-ratio increase or extension is performed. In addition, because reduction of the possibility of signal collisions can decrease the number of times of discovery trials, the time before start of a service can be shortened as well.

The present embodiment limits the number of ONUs that respond at a time by including ONU's individual number and an address mask into a transmission permission signal for discovery; however, a bit value can be directly designated in the address mask instead of designating ONU's individual number. In addition, while the present embodiment uses a MAC address as the individual number of an ONU, serial numbers, production numbers or the like can also be used.

Second Embodiment

The first embodiment masks a part of an ONU individual number to limit the number of ONUs that are allowed to respond at a time, thereby avoiding collisions of registration request signals without extending the discovery window. In the present embodiment, by associating an individual number of an ONU with a distance between an OLT and the ONU, registration request signals from ONUS can be received without extending the discovery window, even when further extension is performed. A PON system according to the present embodiment has the same configuration as the first embodiment described above.

FIG. 6 depicts an outline of discovery in the present embodiment. As an example, the present embodiment assumes a case that a distance between ONU a and an OLT is short (with no offset for discovery window) and a distance between ONU b and the OLT is long (with offset for discovery window). When searching for any ONU to be newly connected, for example, the OLT does not provide a discovery window that can cover distances to all ONUs. Instead, the OLT uses a narrow discovery window to perform discovery for a short distance and for a long distance separately. When short-distance discovery is performed, the OLT sets a discovery window so that the ONU b which is positioned at a longer distance does not respond. Also, when long-distance discovery is performed, the OLT sets a discovery window so that the ONU a positioned at a shorter distance does not respond.

FIG. 7 is an example of a correspondence between the OLT-ONU distance and a MAC address of an ONU. In this example, four bits from BIT7 to BIT4 of the fourth octet is associated with the distance from the OLT. That is, when the distance from the OLT is 0 to 10 kilometers, the four bits BIT7 to BIT4 in the fourth octet of a MAC address is set as "0000". Similarly, when the distance from the OLT is 10 to 20, 20 to 30, and 30 to 40 kilometers, the four bits BIT7 to BIT4 in the fourth octet is set as "0001", "0010", and "0011", respectively. In this example, four bits in the address mask, which correspond to the four bits BIT7 to BIT4 in the fourth octet of the MAC address, is set as "1111", designating ONUs that are permitted to transmit registration request signals. The "x" in FIG. 7 is an arbitrary number of "0" or "1". In addition, the correspondence is not limited to the one described above and other bit ranges and/or other bits can be used.

Figure 8:
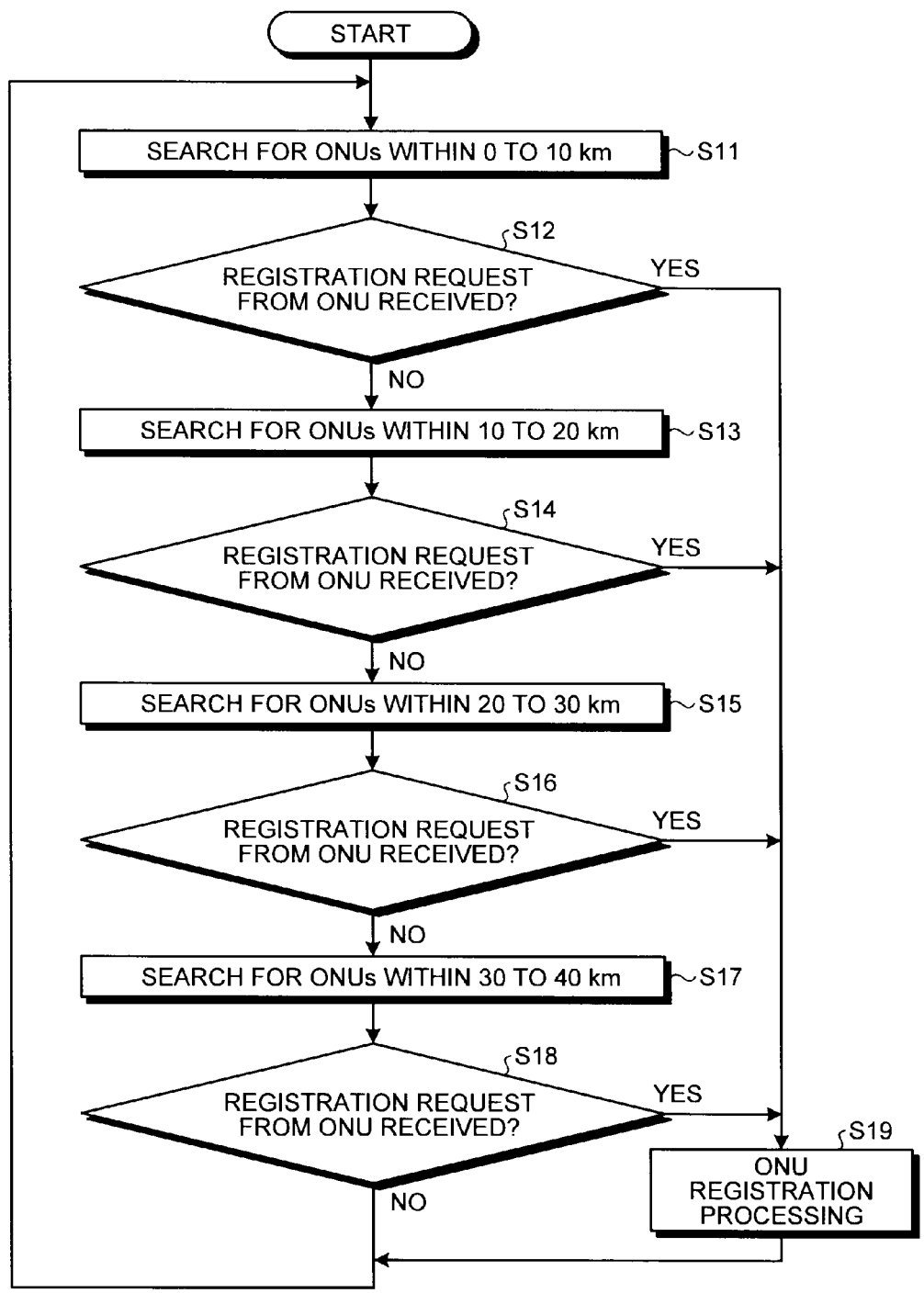
FIG. 8 is a flowchart showing a communication control method according to the second embodiment.

A communication control method according to the second embodiment is explained next in detail with reference to the drawing. FIG. 8 is a flowchart of an operation of the OLT.

First, the PON control unit 7 of the OLT 1 searches for ONUs that are present within the distance of 0 to 10 kilometers from the OLT 1 (Step S11). Specifically, the PON control unit 7 transmits a transmission permission signal for discovery with the destination address set to a MAC address that corresponds to 0 to 10 kilometers shown in FIG. 7 (the fourth octet b7 to b4=0000), setting a discovery window offset of 0 microsecond and a discovery window width of 100 microseconds.

Thereafter, the PON control unit 7 of the OLT 1 checks whether any registration request signal is transmitted from ONUs as a response to the signal transmitted at Step S11 (Step S12). For example, when a registration request signal is received (YES at Step S12), the PON control unit 7 of the OLT 1 determines that the ONU, which has the MAC address set as the source address, is in an operating state, and registers the ONU in the database 9 (Step S19).

When all ONUs that are present in the distance of 0 to 10 kilometers have been registered and a registration request signal can be no longer received at Steps S11 and S12 (NO at Step S12), the PON control unit 7 of the OLT 1 then searches for ONUs that are present within the distance of 10 to 20 kilometers from the OLT 1 (Step S13).

Specifically, the PON control unit 7 transmits a transmission permission signal for discovery with the destination address set to a MAC address that corresponds to 10 to 20 kilometers shown in FIG. 7 (the fourth octet b7 to b4=0001), setting a discovery window offset of 100 microseconds and a discovery window width of 100 microseconds.

Thereafter, the PON control unit 7 of the OLT 1 checks whether any registration request signal is transmitted from ONUs as a response to the signal transmitted at Step S13 (Step S14). For example, when a registration request signal is received (YES at Step S14), the PON control unit 7 of the OLT 1 determines that the ONU, which has the MAC address set as the source address, is in an operating state and registers the ONU in the database 9 (Step S19).

When all ONUs that are present within the distance of 0 to 20 kilometers have been registered and a registration request signal can be no longer received at steps S11 to S14 (NO at Step S14), the PON control unit 7 of the OLT 1 then searches for ONUs that are present in the distance of 20 to 30 kilometers from the OLT 1 (Step S15). Specifically, the PON control unit 7 transmits a transmission permission signal for discovery with the destination address set to a MAC address that corresponds to 20 to 30 kilometers shown in FIG. 7 (the fourth octet b7 to b4=0010), setting a discovery window offset of 200 microseconds and a discovery window width of 100 microseconds.

Thereafter, the PON control unit 7 of the OLT 1 checks whether any registration request signal is transmitted from ONUs as a response to the signal transmitted at Step S15 (Step S16). For example, when a registration request signal is received (YES at Step S16), the PON control unit 7 of the OLT 1 determines that the ONU, which has the MAC address set as the source address, is in an operating state and registers the ONU in the database 9 (Step S19).

When all ONUs that are present within the distance of 0 to 30 kilometers have been registered and a registration request signal can be no longer received at Steps S11 to S16 (NO at Step S16), the PON control unit 7 of the OLT 1 then searches for ONUs that are present in the distance of 30 to 40 kilometers from the OLT 1 (Step S17). Specifically, the PON control unit 7 transmits a transmission permission signal for discovery with the destination address set to a MAC address that corresponds to 30 to 40 kilometers shown in FIG. 7 (the fourth octet b7 to b4=0011), setting a discovery window offset of 300 microseconds and a discovery window width of 100 microseconds.

Thereafter, the PON control unit 7 of the OLT 1 checks whether any registration request signal is transmitted from ONUs as a response to the signal transmitted at Step S17 (Step S18). For example, when a registration request signal is received (YES at Step S18), the PON control unit 7 of the OLT 1 determines that the ONU, which has the MAC address set as the source address, is in an operating state and registers the ONU in the database 9 (Step S19).

Thereafter, the PON control unit 7 of the OLT 1 regularly and repetitively performs the operation (NO at Step S18) until all the ONUs that are present in the distance of 0 to 40 kilometers have been registered in Steps S11 to S18.

While the above example performs ONU search in ascending order of a distance from the OLT 1, search can be performed in different orders. In addition, the discovery window width is not limited to that described above.

As described above, in the present embodiment, an individual number of the ONU is associated with the distance between the OLT and the ONU, and the OLT registers ONUs present in a certain distance range which are found at one discovery, and covers all distance ranges with a narrow discovery window while shifting the timing of start of the discovery window. This can avoid extension of discovery window, even when further extension is performed.

Third Embodiment

The first and second embodiments have described methods of limiting the number of ONUs that are permitted to respond when an OLT performs ONU registration. In the present embodiment, the round-trip time for a once-discovered ONU is stored, and a discovery window is set based on the stored time for the ONU that has once been discovered. A PON system according to the present embodiment has the same configuration as the first embodiment described above.

Figure 9:
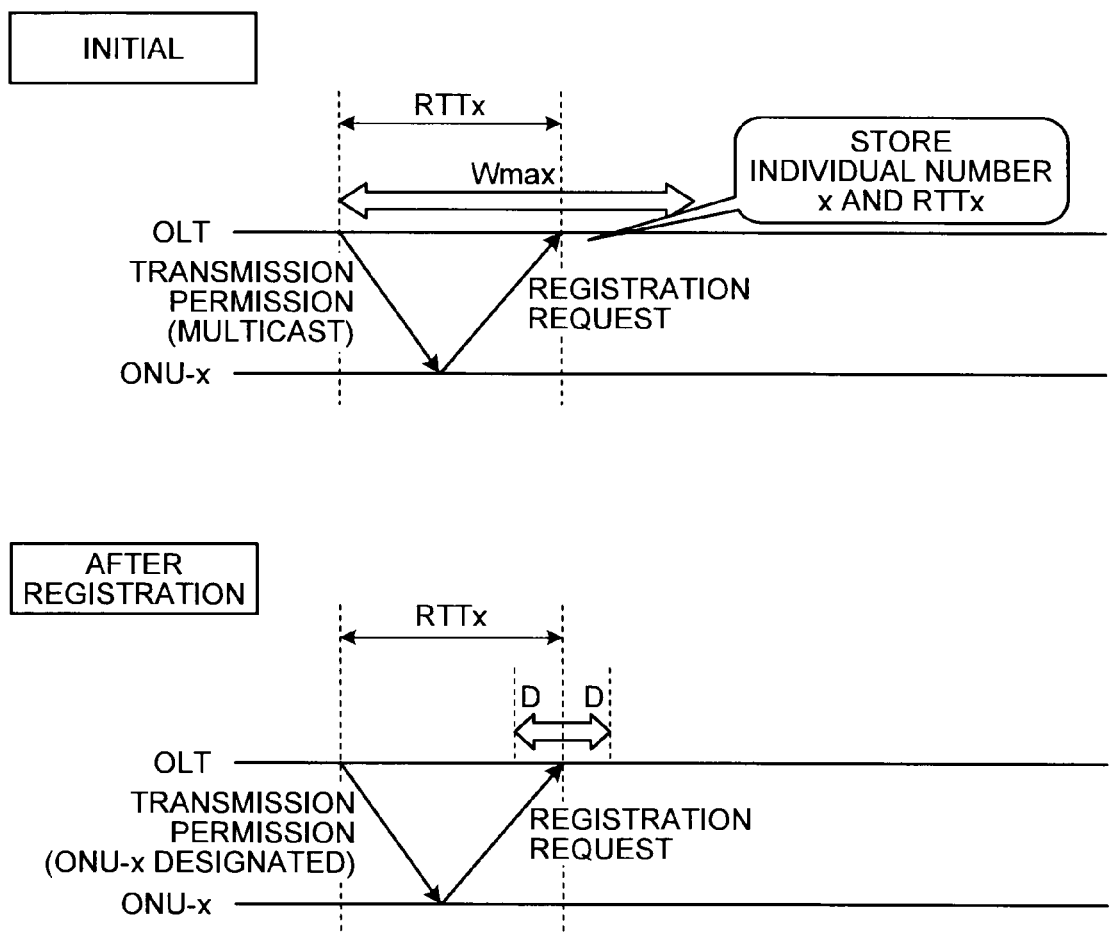
FIG. 9 depicts an outline of discovery in a third embodiment.

In the present embodiment, the OLT 1 conducts two types of discovery as shown in FIG. 9, for example. One is initial discovery for detecting ONUs whose individual numbers have not been registered. The other is after-registration discovery for detecting any ONU that has been discovered in the past and whose individual number has been registered but has gone into a non-operating state once due to power-off or the like and then returned to an operating state, for example, upon being powered on again.

FIG. 9 depicts an outline of discovery in the present embodiment. In the initial discovery, the destination address is set to a multicast address and the discovery window width is set to Wmax, which is a size that can cover a registration request signal from ONU-x which is located farthest from the OLT 1. When a registration request signal is received in the initial discovery, the OLT 1 stores the individual number of ONU-x and its round-trip time (RTTx) in the database 9. The OLT 1 also performs the after-registration discovery shown in FIG. 9 to ONU-x, which has gone into a non-operating state after the initial discovery. As for the after-registration discovery, the OLT 1 transmits a transmission permission signal for discovery in which the MAC address of ONU-x is set as the destination address. The discovery window for after-registration discovery has a narrow window width, which is obtained by setting margins D before and after the end of the round-trip time (RTTx) stored in the database 9.

Figure 10:
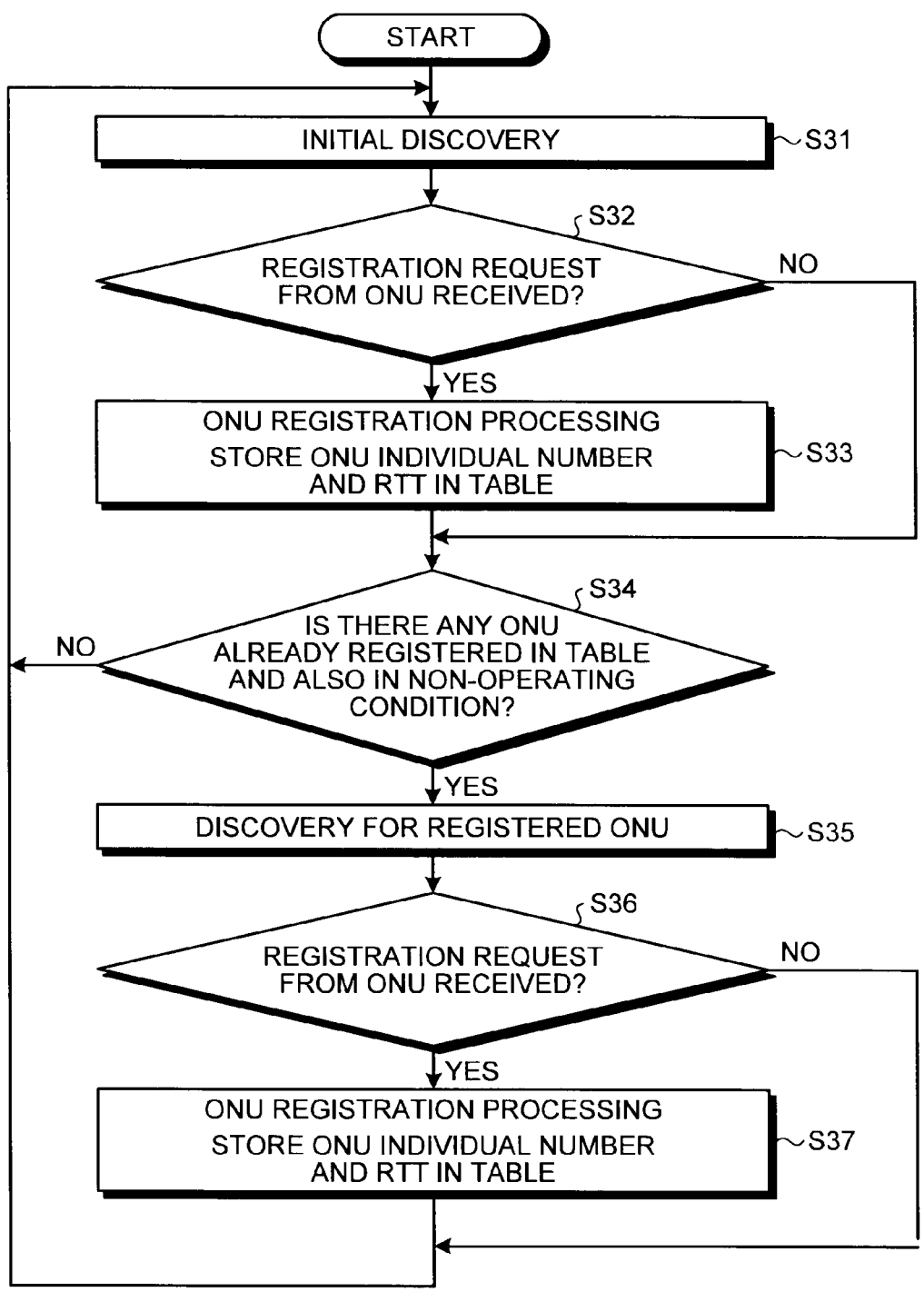
FIG. 10 is a flowchart showing a communication control method according to the third embodiment.

A communication control method according to the third embodiment is explained next in detail with reference to the drawing. FIG. 10 is a flowchart of an operation of the OLT.

The PON control unit 7 of the OLT 1 first starts the initial discovery (Step S31). Specifically, the PON control unit 7 first transmits a transmission permission signal for discovery with the destination address set to a multicast address, a discovery window offset of 0 microsecond, and a discovery window width of Wmax (microseconds).

The PON control unit 7 of the OLT 1 then checks whether any registration request signal is transmitted from ONUs as a response to the signal transmitted at Step S31 (Step S32). For example, when a registration request is received (YES at Step S32), the PON control unit 7 determines that the ONU, which has the MAC address set as the source address, is in an operating state, and registers the ONU in the database 9 (Step S33). The PON control unit 7 also registers the round-trip time (RTT) for the ONU in the database 9 (Step S33).

After completion of registration at Step S33 or when no registration request is received at Step S32 (NO at Step S32), the PON control unit 7 of the OLT 1 next searches for any ONU that is already registered and is in a non-operating state in the database 9 (Step S34). When such an ONU is found (YES at Step S34), the PON control unit 7 of the OLT 1 performs after-registration discovery with respect to that ONU (Step S35). At this step, the PON control unit 7 transmits a transmission permission signal for discovery with the destination address set to the MAC address of the ONU found (designated ONU), the start offset of the discovery window set to "[RTT of the designated ONU]-D (microseconds)", and the discovery window width set to 2D (microseconds), which is the total of margins D set before and after the end of the RTT.

Next, the PON control unit 7 of the OLT 1 checks whether a registration request signal is transmitted from the designated ONU as a response to the signal transmitted at Step S35 (Step S36). For example, when a registration request is received (YES at Step S36), the PON control unit 7 determines that the ONU is in an operating state again and updates the database 9 (Step S37). Thereafter, the PON control unit 7 of the OLT 1 regularly and repetitively performs the operations from Steps S31 to S37.

When no matching ONU is found at Step S34 (NO at Step S34) or when no registration request is received at Step S36 (NO at Step S36), the PON control unit 7 of the OLT 1 proceeds to the initial discovery again.

As described above, the present embodiment stores the round-trip time for an ONU that has once been discovered. In addition, when discovery is performed again for an ONU, which has once been discovered and thereafter gone into a non-operating state, the minimum discovery window is opened based on the round-trip time stored for the ONU in the past. This can significantly reduce the bandwidth consumed for the discovery window.

While the present embodiment has described alternate execution of initial discovery and after-registration discovery, either one of them can be performed with a higher frequency. In addition, when after-registration discovery fails a certain number of times, it is possible to determine that a target ONU has stopped its operation and delete the ONU from the database.

INDUSTRIAL APPLICABILITY

As described above, the communication control method according to the present invention is useful for a PON system, and particularly useful as a communication control method for a case where a split-ratio increase or extension is performed in a PON system.

The invention claimed is:

1. A communication control method performing Discovery processing, which is a procedure at a station side device to detect a subscriber side device newly connected, in a PON system, the method comprising:
 a first discovery step of transmitting, by the station side device, a transmission permission signal for discovery, which includes a multicast address, permitting all subscriber side devices to respond, and further setting a discovery window in a time window in which registration request signals from all the subscriber side devices can be received;
 a registration-request-signal transmitting step of transmitting, by the subscriber side device, which is not registered in the station side device, a registration request signal as a response to a received transmission permission signal;
 a storing step of storing, by the station side device, which has received the registration request signal, an individual number and a round-trip time for the subscriber side device, which has transmitted the registration request signal, wherein
 a second discovery step of transmitting, by the station side device, a transmission permission signal including an individual number of the subscriber side device that has gone into a non-operating state after being once discovered, and further setting a discovery window in a time window in which a registration request signal from the subscriber side device can be received based on a round-trip time stored in past discovery, and
 an address of the subscriber side device and an address mask are included in the transmission permission signal, whereby the station side device designates the subscriber side device which is permitted to transmit a registration request signal based on the address and the address mask.

2. The communication control method according to claim 1, wherein
 the second discovery step is repeated a predetermined number of times, and when no response is returned from the subscriber side device in the non-operating state, the individual number and the round-trip time stored for the subscriber side device are deleted.

3. A station side device that performs Discovery processing, which is a procedure to detect a subscriber side device newly connected, in a PON system, the station side device comprising:
 a station-side-PON control unit that generates and transmits a transmission permission signal for discovery; and
 a storing unit that, upon receiving a registration request signal from an unregistered subscriber side device that has received the transmission permission signal, stores an individual number and a round-trip time for the subscriber side device that has transmitted the registration request signal, wherein
 the station-side-PON control unit comprises:
 a first discovery function of transmitting a transmission permission signal for discovery, which includes a multicast address, permitting all subscriber side devices to respond, and further setting a discovery window in a time window in which registration request signals from all the subscriber side devices can be received,
 a second discovery function of transmitting a transmission permission signal including an individual number of a subscriber side device that has gone into a non-operating state after being once discovered, and further setting a discovery window in a time window in which a registration request signal from the subscriber side device can be received based on a round-trip time stored in past discovery, and
 an address mask is further included in the transmission permission signal, whereby the station side device designates the subscriber side device which is permitted to transmit the registration request signal based on an address of the subscriber side device and the address mask.

4. The station side device according to claim 3, wherein
 the second discovery function is repeated a predetermined number of times, and when no response is returned from the subscriber side device in the non-operating state, the individual number and the round-trip time stored for the subscriber side device are deleted.

* * * * *